Patented May 11, 1937

2,079,973

UNITED STATES PATENT OFFICE 2,079,973

WATER-SOLUBLE SULPHONATION PRODUCTS OF PHOSPHATIDES, AND PROCESS FOR PREPARING SAME

Georg Strauch, Krefeld, Germany, assignor to Chemische Fabrik Stockhausen & Cie, Krefeld, Germany, a German society No Drawing. Application November 11, 1935, Serial No. 49,258. In Germany November 1, 1933

9 Claims. (Cl. 260—99.20)

Phosphatides of vegetable or animal origin have the property, as is well known, of high emulsifiability, and, by reason of this property, are extensively employed in the leather industry for stuffing leather. It is also known to employ as stuffing agents for leather not only emulsions of these phosphatides themselves but also emulsions of mixtures of phosphatides with other fatty oils, minerals oils and so forth.

It has now been found that products with considerably improved properties can be obtained by treating the phosphatides with sulphonating agents.

As starting materials may be employed phosphatides of vegetable or animal origin, for example lecithin obtained from soya bean oil, egg lecithin and the like.

As sulphonating agents may be employed the substances known for this purpose, such as concentrated sulphuric acid, sulphuric acid monohydrate, sulphur trioxide, oleum, chlorosulphonic acid as well as mixtures of these substances. It has also been found that to obtain faultless products the sulphonation agent must be employed in a quantity of at least 60% of the weight of the phosphatide.

The conditions to be maintained during the sulphonation depend on the kind of starting material and sulphonating agent employed. Preferably, the working temperatures do not exceed 10° C.

The sulphonation can be carried out in the presence of diluents or solvents such as hydrocarbons, for example benzine or chlorinated hydrocarbons, for example perchlorethylene trichlorethylene or carbon tetrachloride. The sulphonation can also be assisted by the addition of dehydrating agents, for example anhydrides and chlorides of organic acids, e. g. acetic anhydride, anhydrous sodium sulphate and the like.

Without impairing the excellent qualities of the products which can be obtained in accordance with the invention, it is also possible to add to the phosphatides before sulphonation fats, oils or their fatty acids in a quantity which preferably does not exceed the quantity of the phosphatide. The sulphonation products obtained, in contradistinction to the phosphatides themselves, dissolve in water to form a clear solution.

The following examples show various methods of carrying the invention into effect, but the invention is not in any way limited to these examples.

Example 1

100 parts by weight of soya bean lecithin are dissolved in 250 parts by weight of perchlorethylene and are treated with 100 parts by weight of sulphuric acid monohydrate at a temperature of 0–10° C. After the reaction is complete, the sulphonate is washed with ice, neutralized and freed from solvent.

Example 2

100 parts by weight of soya lecithin are mixed with 25 parts by weight of acetic anhydride and 100 parts by weight of trichlorethylene and the mixture is treated at a temperature of 0–10° C. with 200 parts by weight of concentrated sulphuric acid. The sulphonation product is worked up in the same way as the product obtained in Example 1.

Example 3

50 parts by weight of soya lecithin are mixed with 50 parts by weight of castor oil fatty acid and 200 parts by weight of benzine, and 120 parts by weight of sulphuric acid monohydrate are introduced at a temperature of from 0–5° C. The sulphonation product is washed with ice and neutralized after removal of the acid water. After distillation of the benzine it is brought to the desired fat content.

Example 4

80 parts by weight of soya lecithin are mixed with 20 parts by weight of olive oil and 200 parts by weight of carbon tetrachloride, and 120 parts by weight of sulphuric acid monohydrate are introduced into the mixture at a temperature of from 0–5° C. The sulphonation product obtained is worked up in the same manner as in Example 3.

Example 5

70 parts by weight of soya lecithin are mixed with 30 parts by weight of castor oil fatty acid and 200 parts by weight of trichlorethylene, and 100 parts by weight of sulphuric acid monohydrate are then introduced. The sulphonation product is worked up in the same manner as in Example 3.

Example 6

100 parts by weight of lecithin from yoke of egg are dissolved in 400 parts by weight of trichlorethylene and sulphonated with 120 parts by weight of sulphuric acid monohydrate at a temperature of from 0–10° C. After the reaction is complete the product is worked up in the usual manner.

Example 7

100 parts by weight of soya lecithin are dissolved in 200 parts by weight of trichlorethylene. 80 parts by weight of 12% oleum are gradually introduced into the solution at a temperature of from 0–5° C. The sulphonation product is washed and worked up in the usual manner.

Example 8

100 parts by weight of egg lecithin are dissolved in 100 parts by weight of carbon tetrachloride. 140 parts by weight of sulpho-acetic acid are gradually added to the solution at a temperature of about 40° C. After the reaction is complete the sulphonation product is neutralized and freed from solvent.

Example 9

100 parts by weight of soya lecithin are dissolved in 200 parts by weight of benzine. 120 parts by weight of xylene-sulphonic acid are first added to the solution and then 50 parts by weight of sulphuric acid monohydrate at a temperature of about 0–10° C. The sulphonation product is washed with an ice and common salt solution and worked up in known manner.

It has further been found that products can be obtained of which the properties not only equal those of the sulphonation products of the phosphatides but are even superior to these in many cases if the sulphonation of the phosphatides is carried out, in accordance also with the invention, in the presence of reactive organic substances, in particular substances capable of condensation. As suitable condensation agents may be mentioned, for example, aliphatic, aromatic or hydroaromatic alcohols, aldehydes or their derivatives and substitution products or aromatic hydrocarbons.

Also, when working in the presence of organic substances capable of condensation, the sulphonation can be carried out in the presence of diluents or solvents or dehydrating substances. Further, the operating conditions may vary within wide limits according to the kind of starting materials, the additional substances and the sulphonating agents employed. In this case also it has been found desirable to employ the sulphonating agent in a quantity at least equal to 60% of the weight of the phosphatide, and it is preferable to keep the temperature below about 10° C. during the sulphonation.

Similar products can also be obtained if, instead of carrying out the condensation and sulphonation simultaneously in one operating stage, the phosphatides are first condensed with the reactive agent and are then sulphonated. The following examples are also given merely by way of explanation and the invention is also by no means limited thereto.

Example 10

A mixture of 100 parts by weight of commercial soya lecithin, 50 parts of butyl alcohol and 200 parts of trichlorethylene are sulphonated at a temperature of from 0–6° C. with 120 parts by weight of sulphuric acid monohydrate. After the reaction is complete the sulphonation product is washed with an ice-Glauber's salt solution. The acid water is removed and after neutralization and removal of the solvent there is obtained a liquid product which forms a clear solution in water.

Example 11

100 parts by weight soya lecithin are mixed with 75 parts by weight of xylene. 300 parts by weight of sulphuric acid monohydrate are introduced into the solution at a temperature of from 0–7° C. The sulphonation product is worked up in the usual manner.

Example 12

100 parts by weight of technical soya lecithin and 10 parts by weight of an alcohol mixture, such as is obtained in the hydrogenation of coconut oil fatty acid, are dissolved in 200 parts by weight of benzine. 120 parts by weight of sulphuric acid monohydrate are introduced into the solution at a temperature of from 0–10° C. After the reaction is complete the sulphonate is washed with an ice-Glauber's salt solution and, after neutralization with alkali, is freed from the solvent.

Example 13

120 parts by weight of sulphuric acid monohydrate are introduced at a temperature of from 0–6° C. into a solution of 100 parts by weight of soya lecithin, 15 parts by weight oleic alcohol and 200 parts by weight of carbon tetrachloride. After the reaction is complete the sulphonate is washed and worked up in the usual manner.

Example 14

100 parts by weight of egg lecithin are condensed with 40 parts by weight of oleic acid chloride at a temperature of from 50 to 60° C. The condensation product is dissolved in 200 parts by weight of perchlorethylene and is sulphonated with 160 parts by weight of sulphuric acid monohydrate at a temperature of 0–7° C. The product of the reaction is worked up in the usual manner.

Example 15

100 parts by weight of soya lecithin and 20 parts by weight of oleic alcohol are dissolved in 200 parts by weight of trichlorethylene. After the addition of 25 parts by weight of acetic anhydride, 150 parts by weight of sulphuric acid monohydrate are introduced at a temperature of 0–10° C. The sulphonation product is washed with an ice-common salt solution and neutralized after removal of the acid water.

Example 16

100 parts by weight of chlorosulphonic acid are gradually introduced at a temperature of from 0–5° C. into a mixture of 100 parts by weight of soya lecithin, 25 parts by weight methyl hexalin and 200 parts by weight of trichlorethylene. After the reaction is complete, the product is washed with an ice-salt solution, neutralized and freed from solvent.

Example 17

100 parts by weight of egg lecithin are mixed with 25 parts by weight of benzaldehyde and 200 parts by weight of perchlorethylene. The solution is sulphonated with 80 parts by weight of oleum (12%) at a temperature of from 0–5° C. The sulphonation product is worked up in known manner.

It has been found that the products obtained in accordance with the invention have excellent properties, for example have high emulsifying power, great stability towards acid and high wetting and permeating power and so forth.

These properties open up an entirely new field of use for the water-soluble sulphonation products of the phosphatides. Whereas the phosphatides per se or their mixtures with other fats are, as is well known, insoluble in water and can only be employed in the form of emulsions, the sulphonation products obtained in accordance with the invention can be used in the form of a clear aqueous solution and consequently have a much better permeating and penetrating power both as regards leather and also as regards all textile fibres. The sulphonated phosphatides are also distinguished by their high stability towards acid as compared with the phosphatides themselves, or their mixtures with other fats, which exhibit no stability towards acid. A further important advantage is the high degree of insensitivity to lime and the great protective colloid effect of the sulphonated phosphatides, by which for example precipitation from lime soap can be prevented even in water of a hardness of 30° German hardness.

Owing to these properties, the new products can be extensively employed as washing, wetting, emulsifying, dispersing, cleaning, softening, equalizing, loading, penetrating, reviving, brightening or finishing agents, for example in the textile industry, in the leather industry, in the cosmetic industry and so forth. The sulphonated phosphatides can be employed for emulsifying mineral oils and the like, for making pastes with dyes, for padding in the vat, as protective colloids and for other purposes as described in the following examples. The possibilities for which the new products may be employed are not, however, limited to those mentioned in the examples.

*Example 18*

For increasing the permeation by an indanthrene dyestuff of a material which the dyestuff, for example indanthrene blue GZD dopp. Teig, has difficulty in permeating, the dyestuff is made up in unreduced form into a paste or suspension with 10 grams per litre of the product manufactured in accordance with Example 3 and is padded on the material at a temperature of about 60° C. This treatment is effected in the case of textile fabric on the Foulard, and in the case of bead yarns and linen yarns on the liquoring machine. The pretreated material is developed, after padding, in a false vat. This contains the quantity of soda liquor necessary for the aforesaid dyestuff, namely 12 cc. NaOH 36° Bé., and hydrosulphite, namely 3 grams, per litre, and has the necessary temperature of 60° C. for the dye in question. The permeation of the color effect thus obtained considerably exceeds that of a normal vat and cannot be obtained by the addition of wetting agents to the vat. Another advantage is that no separation occurs in the padding bath even when the water employed for this has a hardness of 12° German hardness.

*Example 19*

For washing or rinsing processes in which only hard water is available there is added to the washing liquid or to the rinsing bath 0.5 grams per litre of the product obtained according to Example 1. By this means separations from lime soap are avoided with certainty both when washing and also when rinsing.

*Example 20*

For the preparation of the bottoming bath naphthol AS—SW there is employed instead of a Turkey red oil the product according to Example 3, whereby separations of calcium naphtholate are avoided even with very hard water. The stabilization of the bottoming bath which is thereby obtained also effects an increase in the fastness to rubbing. Further, the use of the aforesaid product enables a better and quicker permeation of the material to take place.

*Example 21*

A quicker and better permeation of the material is obtained by adding to the indanthrene vat 2 grams per litre of the product manufactured according to Example 3. The increase in the wetting power takes place at all the temperatures in question in the case of the indanthrene vat, namely 20° C.:IK, 40° C.:IW, 60° C.:IN.

*Example 22*

When restuffing or filling hides, a chrome alum-common salt solution of about 15 grams chrome alum 6/12 basic and 12 grams common salt per litre, to which has been added 50 grams per litre of the product obtained in accordance with Example 5, is energetically brushed in and the hides are then dried. The product obtained according to Example 5 has a high resistance to chrome alum and common salt so that no separation occurs.

*Example 23*

In order to make a paste of indocarbon CLG conc. (Schultz dyestuff Tables No. 1114), the product obtained according to Example 11 is thoroughly stirred with the dyestuff in an amount equal to twice that of the dyestuff. By this means the dyestuff is obtained in the form of such a fine dispersion that, after its addition to the alkaline bath, a homogeneous suspension is obtained. This can be easily and completely reduced in the vat. The presence in the dye bath of the product according to Example 11 has an equalizing effect on the dyeing and, owing to its dispersing effect, prevents the deposit of superfluous dyestuff on the surface of the fibres. By this means the fastness of the dye to rubbing is increased and bronzing is avoided.

*Example 24*

A cotton fabric is finished with 300 grams of Epsom salts and 5 grams of the product obtained according to Example 13. The product obtained according to Example 13 is distinguished from the other products by its absolute resistance to Epsom salts as well as by its favorable effect on the feel and smoothness of the finished fabric. Further, the addition of this product prevents the deposit of the Epsom salts finish.

*Example 25*

For washing and rinsing processes in which only hard water is available, 0.5 grams of the product obtained according to Example 17 are added to the washing liquid or to the rinsing bath. By this means separation from lime soap is avoided both when washing as well as when rinsing.

*Example 26*

Raw woolen goods are treated in sulphuric acid of 4° Bé. which contains per litre 2 grams of the product manufactured according to Example 13. The material is treated for 20 minutes in this bath and is then placed in the oven in which it is dried in the usual manner.

I claim:—

1. The process for the manufacture of water-soluble sulphonation products of the phosphatides which comprises treating the phosphatide with a sulphonating agent in quantity at least equal to 60% of the weight of the phosphatide.

2. A process according to claim 1, wherein a sulphonating agent from the groups consisting of sulphuric acid, oleum, sulphur trioxide, chlorosulphonic acid and mixtures of these is employed.

3. A process according to claim 1, wherein the sulphonation is effected at temperatures below 10° C.

4. A process according to claim 1, wherein a substance from the group consisting of fats, oils and their fatty acids is added to the phosphatide before the sulphonation.

5. A process according to claim 1, wherein a substance from the group consisting of fats, oils and their fatty acids is added to the phosphatide before sulphonation in a quantity which does not exceed the quantity of the phosphatide employed.

6. A process according to claim 1, wherein the sulphonation is carried out in the presence of an inert solvent.

7. A process according to claim 1, wherein the sulphonation is carried out in the presence of a dehydrating agent.

8. A process according to claim 1, wherein the sulphonation is carried out in the presence of an inert solvent and of a dehydrating agent.

9. Washing, wetting, emulsifying, dispersing, cleaning, softening, equalizing, loading, penetrating, reviving and finishing agents consisting essentially of sulphonated phosphatides distinguished by their solubility in water, their high permeation and penetration power, their stability to acid, their insensitiveness to lime and their high protective colloid effect.

GEORG STRAUCH.